E. P. THOMAS.
SHOCK ABSORBER.
APPLICATION FILED JAN. 18, 1918.
1,313,763.
Patented Aug. 19, 1919.
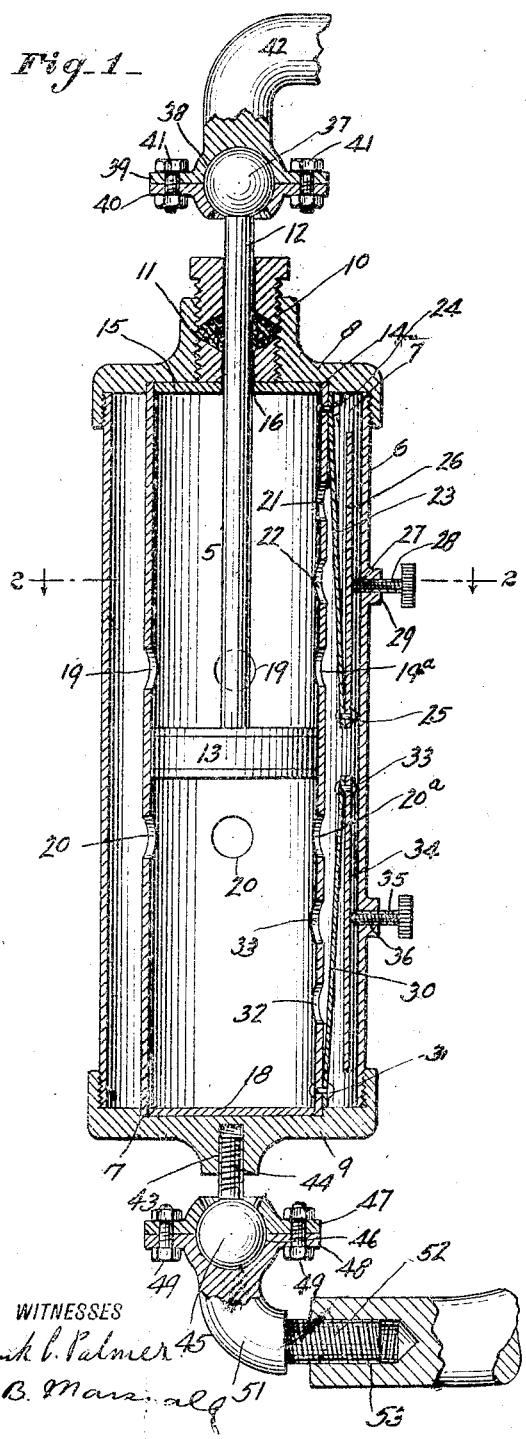
Fig. 1.
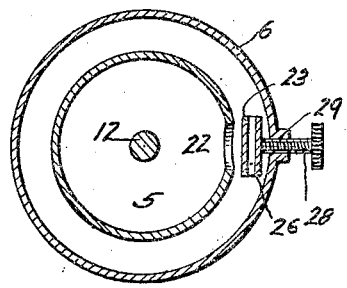
Fig. 2.
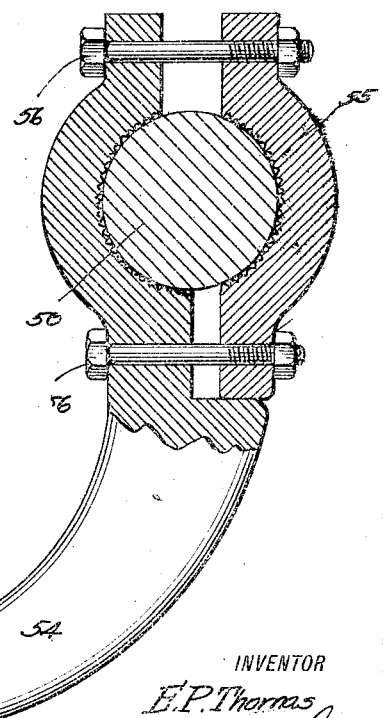
WITNESSES
Frank C. Palmer
E. B. Marshall
INVENTOR
E. P. Thomas
BY Munn & Co.
ATTORNEYS

UNITED STATES PATENT OFFICE.

EDMUND P. THOMAS, OF CENTRALIA, WASHINGTON.

SHOCK-ABSORBER.

1,313,763.        Specification of Letters Patent.        Patented Aug. 19, 1919.

Application filed January 18, 1918. Serial No. 212,435.

*To all whom it may concern:*

Be it known that I, EDMUND P. THOMAS, a citizen of the United States, and a resident of Centralia, in the county of Lewis and State of Washington, have invented a new and Improved Shock-Absorber, of which the following is a full, clear, and exact description.

My invention has for its object to provide a shock absorber with a novel form of valve for controlling the passage of a fluid from a cylinder through ports leading to a by-pass, the valve being operable from without the shock absorber.

Another object of the invention is to provide a valve means for a row of ports in the cylinder which will control the passage of a fluid through the ports in accordance with a predetermined ratio.

Still another object of the invention is to provide a novel means for connecting the shock absorber with parts of a vehicle.

Additional objects of the invention will appear in the following specification, in which the preferred form of the invention is described.

In the drawings, similar reference characters refer to similar parts in both of the figures, in which—

Figure 1 is a sectional elevation of the invention, and

Fig. 2 is a sectional view on the line 2—2 of Fig. 1.

By referring to the drawings, it will be seen that a cylinder 5 is provided, the said cylinder 5 being disposed within a casing 6 and being spaced therefrom to form a by-pass 7. One end of the cylinder 5 in the casing 6 is inclosed by a head 8 and the other ends of the cylinder 5 in the casing 6 are inclosed by a head 9. There is a threaded opening 10 in the head 8 in which is secured a gland 11 of the usual construction through which passes a piston rod 12 mounted on a piston 13 disposed in the cylinder 5. There is preferably a recess 14 at the inner side of the head 8 in which one end of the cylinder 5 is disposed, a washer 15 being also disposed in this recess 14 within the cylinder 5. The washer 15 has an opening 16 through which the piston rod 12 is disposed. At the inner side of the other head 9, there is a similar recess 17 in which the other end of the cylinder 5 and a washer 18 are disposed.

Intermediate the ends of the cylinder 5, there are a set of ports 19 and 19ª which are spaced apart around the cylinder and which afford communication between the interior of the cylinder and the by-pass 7 which is formed by the cylinder 5 and the casing 6. In addition to the ports 19 and 19ª there is another set of similar ports 20 and 20ª which are also spaced apart around the cylinder intermediate the ends of the cylinder. As will be seen by referring to Fig. 1 of the drawings, the ports 20 and 20ª are disposed nearer the head 9 than they are to the head 8 and the ports 19 and 19ª are disposed nearer the head 8 than they are to the head 9. There are also ports 21 and 22 in the cylinder 5 which are disposed between the port 19ª and the head 8. The ports 21 and 22 and 19ª are disposed in a row, so that the flow of a fluid through the ports may be controlled by a valve 23 which is in the form of a leaf spring secured at its end 24 to the cylinder 5 adjacent the head 8.

Secured to the other end 25 of the valve 23, there is a member 26 which is in position for engagement by the end 27 of a screw 28 which meshes in a threaded orifice 29 in the casing 6. It will be understood that the screw 28 may be turned from without the shock absorber to press inwardly the member 26 which will press the valve 23 in the direction of the ports 21, 22 and 19ª, and that inasmuch as the valve 23 is secured to the cylinder adjacent the head 8 and the member 26 is secured to the valve 23 at a point spaced at considerable distance therefrom, when the valve 23 is moved inwardly relatively to the ports 21, 22 and 19ª, communication through the port 21 will always be restricted to a greater extent than will be the communication which is possible through the ports 22 and 19ª, and that the communication between the port 22 will always be restricted with reference to the possibility of communication through the port 19ª. It will also be seen that this restriction of the communication through the ports 21 and 22 with reference to the port 19ª will be in accordance with a predetermined ratio.

In a similar manner a valve 30, similar in construction to the valve 23, is secured to the cylinder 5 at 31 adjacent the head 9, the said valve 30 controlling communication between the ports 32 and 33 which form with the port 20ª a row of ports. To the other end of the valve 30, there is secured at 33 a member 34 which is operated by a screw 35 meshing in a threaded orifice 36 in the casing 6. At all times the valve 30 restricts communication through the port 32 as compared with the communication which is afforded through the port 33, and in the same manner the valve 30 restricts communication through the port 33 relatively to the communication afforded through the port 20ª.

When the shock absorber is in use and the piston 13 moves in the direction of the head 9, air is forced through the ports 20 and 20ª and also through the ports 33 and 32, provided that they are not closed by the valve 30, until the piston 13 passes beyond the ports, when the air or other fluid which may be used is compressed between the piston 13 and the head 9 and a partial vacuum is produced between the piston 13 and the head 8. On the return movement of the piston, the air or other fluid is compressed between the piston 13 and the head 8 and a partial vacuum occurs between the piston 13 and the head 9. By the adjustment of the valves 23 and 30, it is possible, when the shock absorber is used, to compress a larger volume of air or other fluid between the piston 13 and the heads 8 and 9, or when desired, it is possible to restrict the ports 20, 21, 32 and 33 to delay the flow of the air or other fluid through the ports when the air or other fluid is compressed by the piston 13 against the heads 8 and 9.

The outer end of the piston rod 12 is provided with a ball 37 which is disposed in a socket 38, formed by the members 39 and 40 which are held in position relatively to each other by the bolts 41, the member 39 forming a part of a bracket 42 which may be secured by any suitable means to the body of an automobile or other vehicle.

In the head 9 there is a threaded orifice 43 in which meshes a threaded stud 44 having a ball 45 which is disposed in a socket 46 formed by the members 47 and 48 which are held in position by bolts 49, the member 48 being connected with an axle housing 50 or with some other portion of a chassis or the running parts of a vehicle.

As illustrated in the drawings, the member 48 forms a part of an elbow 51 having a threaded shank 52 which meshes in a threaded opening 53 in a bracket 54, having a detachable part 55, the bracket 54 and its detachable part 55 being secured around the axle housing 50 by means of bolts 56.

Having thus described my invention, I claim as new and desire to secure by Letters Patent:

1. In a shock absorber, a cylinder having two heads, one with an opening, a piston in the cylinder, a piston rod secured to the piston and disposed through the opening, a casing forming with the cylinder a passage, the cylinder having a row of ports, and valve means operable from without the shock absorber for controlling the flow of a fluid through the ports in accordance with a predetermined ratio.

2. In a shock absorber, a cylinder having two heads, one with an opening, a piston in the cylinder, a piston rod secured to the piston and disposed through the opening, a casing forming with the cylinder a by-pass, the cylinder having two rows of ports, one row adjacent each of its heads, and two valve means operable from without the shock absorber for controlling the flow of a fluid through the ports in accordance with a predetermined ratio.

3. In a shock absorber, a cylinder having two heads, one with an opening, a piston in the cylinder, a piston rod secured to the piston and disposed through the opening, a casing forming with the cylinder a passage, the cylinder having a row of ports, and a valve means operable from without the shock absorber for controlling the flow of a fluid through the ports, the valve means being positioned angularly with relation to the cylinder and normally adjusted inwardly.

4. A shock absorber, having a piston disposed in a cylinder with a by-pass of a plurality of ports characterized by a leaf valve secured at one end to the cylinder and operable from without the shock absorber for controlling the flow of a fluid through one of the parts.

5. A shock absorber having a piston disposed in a cylinder connected with a by-pass by two rows of ports, one row adjacent each end of the cylinder characterized by two lead valves, each secured at one end to the cylinder, one beyond one row of ports and the other beyond the other row of ports for controlling the flow of a fluid through the ports.

6. In a shock absorber, a cylinder having two heads, one with an opening, a casing having an orifice and which forms with the cylinder a by-pass, the cylinder having ports leading to the by-pass, a piston in the cylinder, a piston rod secured to the piston and disposed in the opening, a valve secured at one end to the cylinder for controlling the flow of a fluid through one of the ports, and a control member disposed through the orifice for operating the valve.

7. In a shock absorber, a cylinder having two heads, one with an opening, a casing having an orifice which forms with the cylinder a by-pass, the cylinder having ports leading to the by-pass, a piston in the cylinder, a piston rod secured to the piston and disposed in the opening, a leaf spring secured at one end to the cylinder which acts as a valve for controlling the flow of a fluid through one of the ports, a control member disposed through the orifice for operating the leaf spring, and means on the leaf spring for engagement by the control member.

8. In a shock absorber, a cylinder having two heads, one with an opening, a casing having an orifice which with the cylinder forms a by-pass, the cylinder having ports leading to the by-pass, a piston in the cylinder, a piston rod secured to the piston and secured in the opening, a leaf spring secured at one end to the cylinder for controlling the flow of a fluid through one of the ports, a member secured at the other end of the leaf spring and disposed longitudinally thereof, and a control member disposed through the orifice and engaging the first member for the purpose specified.

9. A shock absorber, having a piston disposed in a cylinder, connected with a by-pass by a plurality of ports characterized by a leaf valve secured at one end to the cylinder and operable from without the shock absorber for controlling the flow of a fluid through the ports in accordance with a predetermined ratio.

10. In a shock absorber, a cylinder having two heads, one with an opening, a casing forming with the cylinder a by-pass, the cylinder having two sets of ports disposed around its sides, one set being nearer one head than the other set, the cylinder also having additional ports disposed between each of the two sets of ports and its head, a piston in the cylinder, a piston rod secured to the piston and disposed through the opening in the head, and valve means operable from without the casing for controlling the flow of a fluid through the said additional ports in accordance with a predetermined ratio.

11. In a shock absorber, a cylinder having two heads, one with an opening, a casing having an orifice forming with the cylinder a by-pass, the cylinder having two sets of ports disposed around its sides, one set being nearer one head than the other set, the cylinder also having additional ports disposed between the two sets of ports and its heads, a piston in the cylinder, a piston rod secured to the piston and disposed through the opening in the head, two valves, each secured at one of its ends to the cylinder for controlling the flow of a fluid through the additional ports, and control means operable from without the shock absorber for operating the valves.

EDMUND P. THOMAS.